Aug. 31, 1965             E. G. BAILEY            3,203,784
METHOD AND APPARATUS FOR PRODUCING GASEOUS PRODUCTS FROM SOLID
FUEL AND USING SAME FOR THE REDUCTION OF IRON ORE
Filed Oct. 10, 1960                                   4 Sheets-Sheet 2
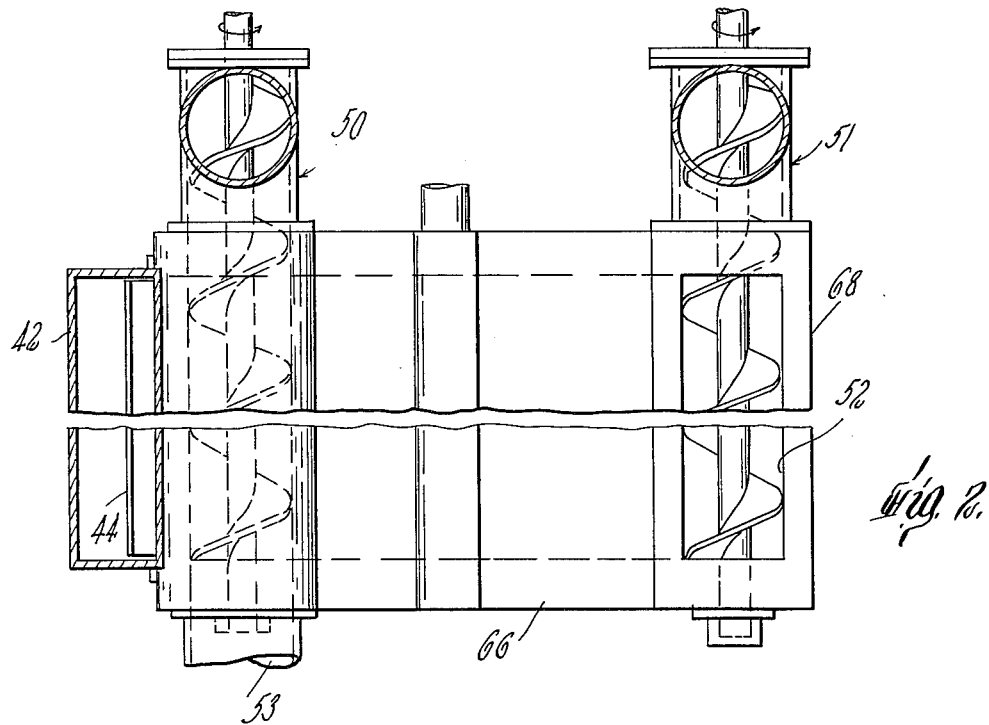
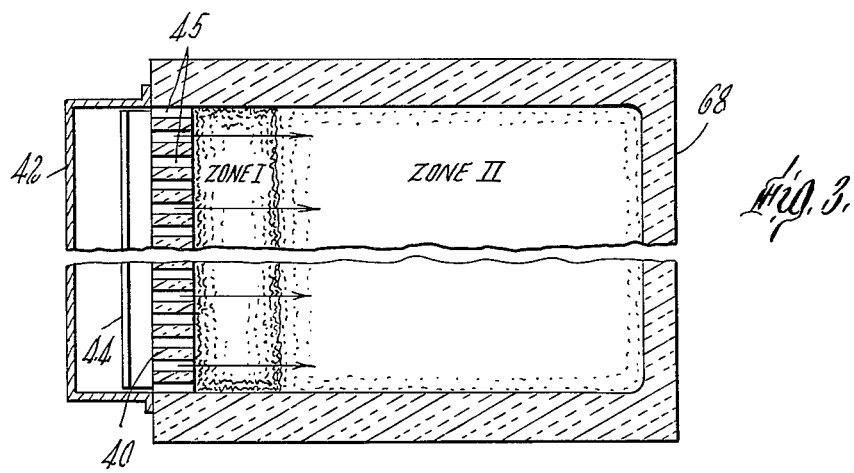

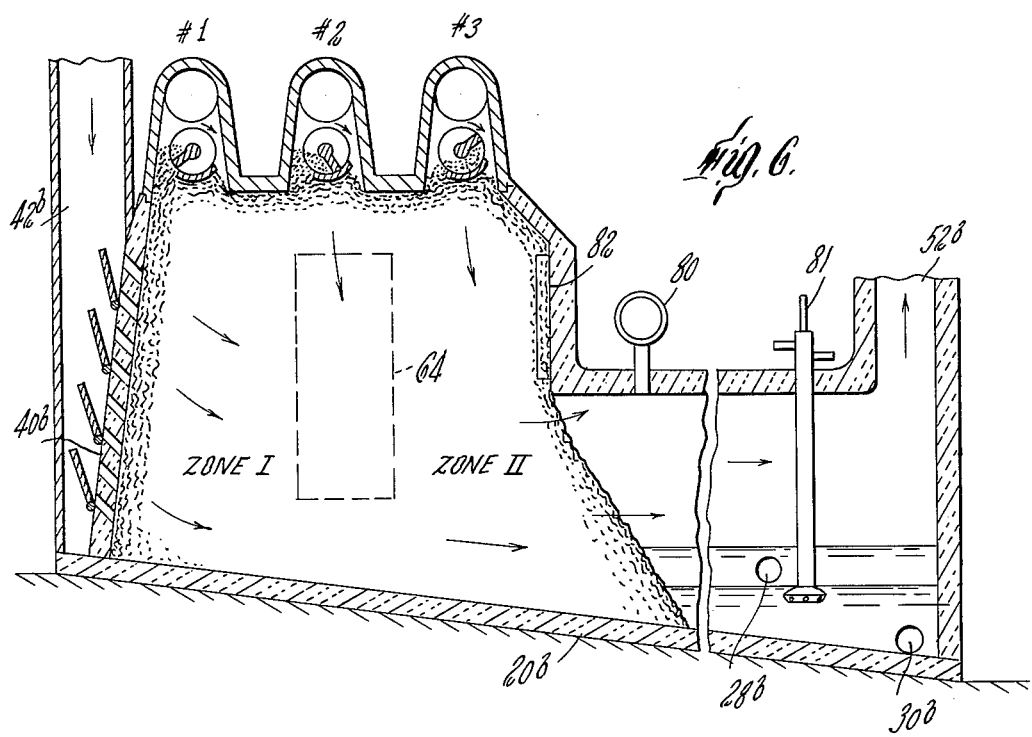

United States Patent Office 3,203,784
Patented Aug. 31, 1965

3,203,784
METHOD AND APPARATUS FOR PRODUCING GASEOUS PRODUCTS FROM SOLID FUEL AND USING SAME FOR THE REDUCTION OF IRON ORE
Ervin G. Bailey, Easton, Pa., assignor to Bailey Inventions, Inc., Easton, Pa., a corporation of Pennsylvania
Filed Oct. 10, 1960, Ser. No. 61,633
2 Claims. (Cl. 75—40)

This is a continuation-in-part of application S.N. 817,143, filed June 1, 1959 and now abandoned.

This invention relates to the production of clean carbon monoxide gas by the gasification of solid carbon-containing fuel for reactive agent or thermal purposes, for example, in a chemical reduction process, as in the reduction of iron ore, or in the production of high-temperature carbon-monoxide- or carbon-dioxide-containing gases for a variety of thermal uses.

Broadly, the invention is based upon the principle of burning a vertically descending charge of solid organic fuel in such configuration and in such manner as to insure that the major gaseous reaction products formed in the bed emerge from a surface of the bed other than the fuel-replenishing surface thereof. To this end, the descending fuel bed is supported at one side by a porous vertically-extending refractory retaining wall. The opposite side of the bed constitutes the off-gas surface and is defined, supported and retained in substantially vertical position in juxtaposition with an adjacent vertically descending body containing a solid inorganic liquefiable material, chosen for its vertical flow characteristics at the operating temperature. Separate intermittent or continuous feeds of the properly chosen inorganic material and organic fuel onto the top surfaces of the descending charges are so controlled that the interface therebetween can be substantially parallel to the rear refractory wall whereby a fuel bed of substantially constant and predetermined thickness is continuously maintained. Combustion-supporting gas such as air, oxygen or oxygen-enriched air may then be fed through the rear wall at suitable temperature and through the descending bed of fuel directly into the adjacent descending bed of inorganic material, and the composition and volume of the gas and the thickness of the fuel bed are controlled to cause, as desired, only incomplete oxidation of carbon in the solid fuel to carbon monoxide or to secure more complete combustion to carbon dioxide, or a combination of the two.

Because the off-gas surface of the fuel bed is covered by the juxtaposed descending liquefiable material, such off-gas interface as well as the interior of the bed, along most of its height, may be maintained, when desired, at a temperature exceeding the liquid flowing point of the non-combustibles contained in the solid fuel and hence these non-combustibles, which at such temperatures are either themselves molten or part of a flowable eutectic, tend to drain downwardly through the fuel bed in liquid form and are thus gravity separated from the gaseous stream flowing transversely through the descending bed. This descending flow also acts in the manner of a gas washer to minimize unburned fuel particles proceeding with the gaseous reaction products produced in the fuel bed into the inorganic material.

In some cases, supplemental heat input may be provided to the beds from electrodes or from other strategically disposed subsidiary or supplemental solid fuel feeds. In other cases, steam may be introduced to limit the upper temperature developed in the bed.

The thickness of the retaining bed which is usually substantially free from fuel, affects the temperature of the gases released at the off-gas surface of the inroganic material and is controlled according to the nature or temperature or both, of the off gases desired.

Appying the principles of the invention to iron ore reduction, for example, great advantages accrue from using as the sustaining vertically descending charge, iron oxide ore which according to one preferred method of operation, is not intermixed with solid carbon fuel such as the coke used in the present blast furnace operation; for the thickness of the fuel bed is controlled to insure that sufficient carbon monoxide gas emerges from the fuel bed to reduce the ore contained in the retaining bed charge without the necessary generation of further carbon monoxide gas within the ore zone from non-ore sources. The entire solid fuel requirement for performing the iron ore reduction originates within the fuel bed outside of the ore bed.

Absence of fuel carbon in the reducing zone of the iron ore avoids the less predictable complicated endothermic reactions which take place in normal blast furnace operation. It tends to avoid loss of reducing gas which is not put to effective reactive use before escape. In accordance with the preferred form of iron oxide reduction, it is possible to operate with a much more nearly complete combustion in the ore zone of the carbon monoxide to carbon dioxide with the oxygen obtained from the reduction of $2Fe_2O_3$ to $4FE+3O_2$ before the gaseous flow reaches the off-gas surface of the iron oxide bed.

These and other objects of the invention will be more readily understood when taken in connection with the description of the accompanying drawings wherein:

FIG. 2 is a plan view, partly in cross-section, also broken away to indicate extent, of the furnace, taken along the line 2—2 of FIG. 1;

FIG. 3 is a cross-sectional view taken along the line 3—3 of FIG. 1;

FIG. 6 is a vertical cross-section through a still further modified form of iron reduction furnace;

Figure 1:
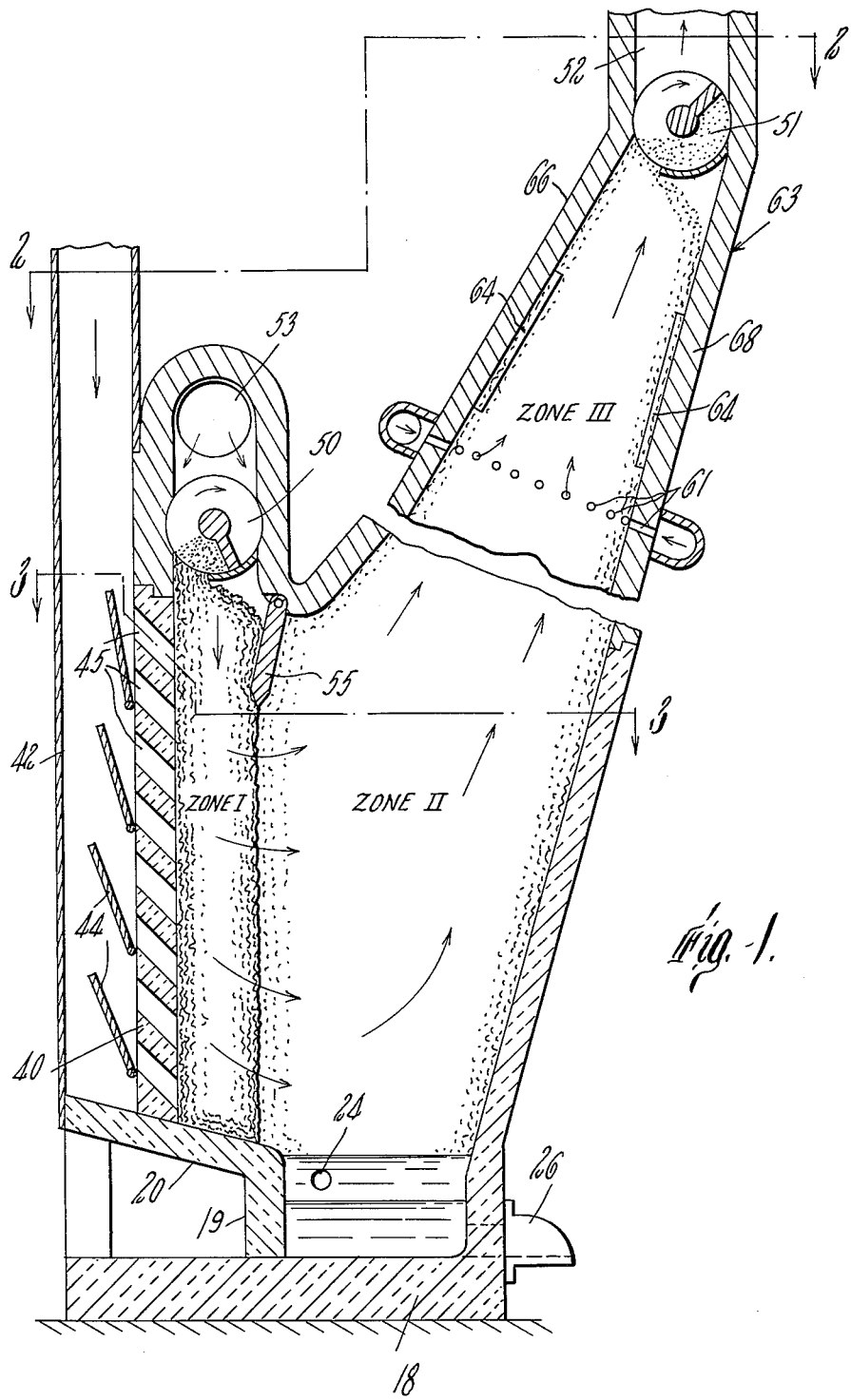
FIG. 1 is a vertical cross-section through an iron reduction furnace designed for operation in accordance with this invention, being broken away to indicate extent.

FIG. 1 shows a furnace comprising a refractory hearth 18. An upstanding refractory wall 19 merges into an inclined imperforate refractory supporting surface 20. The back of the apparatus includes a further upstanding refractory wall 40 communicating with a plenum chamber 42 which is connected to a source of combustion-supporting gas such as pre-heated air, oxygen-enriched air, or oxygen, supplemented if desired by a steam inlet or a gas fuel inlet. A series of adjustable baffles 44 aid in directing the combustion-supporting gases into uniform, or otherwise distributed flow along the height of the wall through spaced apertures 45, provided by spacing refractory bricks.

Arranged over the furnace chamber are two feeds 50 and 51, one for fuel and one for ore, each provided with a conventional screw feed mechanism for distributing the material in a continuous manner across the width of the furnace. The first feed 50 is located over the rear portion of the furnace and the second feed 51, is at the top of a casing 63 having downwardly diverging walls 66 and 68.

Above the feed 51 is a stack 52 for the off gases.

A supplemental combustion-supporting gas inlet 53 is positioned above the fuel feed 50 and an adjustable pivoted gate 55 is provided just below the fuel feed 50 in order to control the thickness of the fuel bed. The gate 55 will have to be water-cooled (not shown), and it should be understood that water-cooled screen tubes or other water-cooled structure may be utilized in partial or entire replacement of the refractory walls, as needed, both in FIG. 1 and in the other embodiments of the invention subsequently described.

The apparatus may also contain electrodes 64 along the upper portion of the walls 66 and 68 and supplemental air inlets 61 for introduction of air or gaseous fuel if required.

In operation any free-burning solid fuel may be fed at the feed 50 while essentially ore and proper proportions of limestone may be fed at the other feed 51. By properly controlling the two feeds, an interface is maintained by the juxtaposition of the beds of different content, thus maintaining an organic fuel bed of substantially uniform thickness and comprising a Zone I of sufficient thickness to foreclose complete combustion of the carbon with the result that the gases emerging at the interface into Zone II are substantially entirely carbon monoxide or $CO+H_2$ in case steam is used for limiting the temperature of the fuel bed.

The result is that hot gases, i.e., above 1500° F., and preferably above 2700° F., proceed across the interface into reduction Zone II in such volume as to reduce the iron ore with conversion of the carbon monoxide into carbon dioxide.

The reduction zone is very simple with only the ore, stone, and slag flowing downwardly from Zone III, where the charge is fully preheated by the rising gases which by heat exchange to the incoming ore are cooled to less than 300° F., and in Zone II the counterflow of hot gas, rich in carbon monoxide and possibly $H_2$ completes the reduction of the FeO to Fe. The gas continues its upward flow as in the standard blast furnace where the remaining carbon monoxide and $H_2$ reduce the $Fe_2O_3$ and $Fe_3O_4$ to FeO effectively in a diminishing percentage of reduction gas, until it is practically all converted to $CO_2$ and $H_2O$. All of the oxygen needed is supplied from the $O_2$ from the reducing of the ore, and its combination with CO and $H_2$ supplies the required amount of heat to make the reduction.

There need be much less CO or $H_2$ escape unburned as is inevitable with the standard blast furnace where the fuel is fed in with the charge at the top of the furnace, and much is wasted from the loss of CO and $H_2$ produced in a zone where they cannot possibly be used before escape.

The rate at which ore is supplied in the present process is proportioned to the supply of reducing gases, CO and $H_2$ as indicated by gas temperatures and gas analyses at the proper points.

When using solid fuel with air as the oxidant, either the fuel or the air, or both, may be pre-heated. Air at 280° F. will burn some carbon to $CO_2$ to provide the required temperature in Zone I. The air can be pre-heated to 1300° F. or higher, as cost permits.

The charge of ore and stone must be adequately heated and calcined before entering the final stage of the reducing zone, as there is a close balance between the heat required for reduction of ore and that made available from the combustion of CO and $H_2$, using the $O_2$ released from the ore by the reduction.

If the sensible heat in the gas leaving the reduction zone is not sufficient to fully heat the charge, the extra heat may be supplied electrically, through electrodes 64, or by using a surplus of fuel in Zone I in proportion to the ore being reduced, and burning this excess carbon monoxide with air injected at the proper place as at 61 in Zone III. Alternately, this heat may be supplied by adding another fuel, for example $CH_4$, together with the required air at 61. Some solid fuel may be added with the charge and burned with air supplied at 61. When there is a surplus of heat as sensible heat in the off gases, it may be used for pre-heating air, fuel or for other economic purposes.

Molten slag and molten iron collect at the bottom of the furnace and may be tapped at 24 and 26, respectively.

Figure 4:
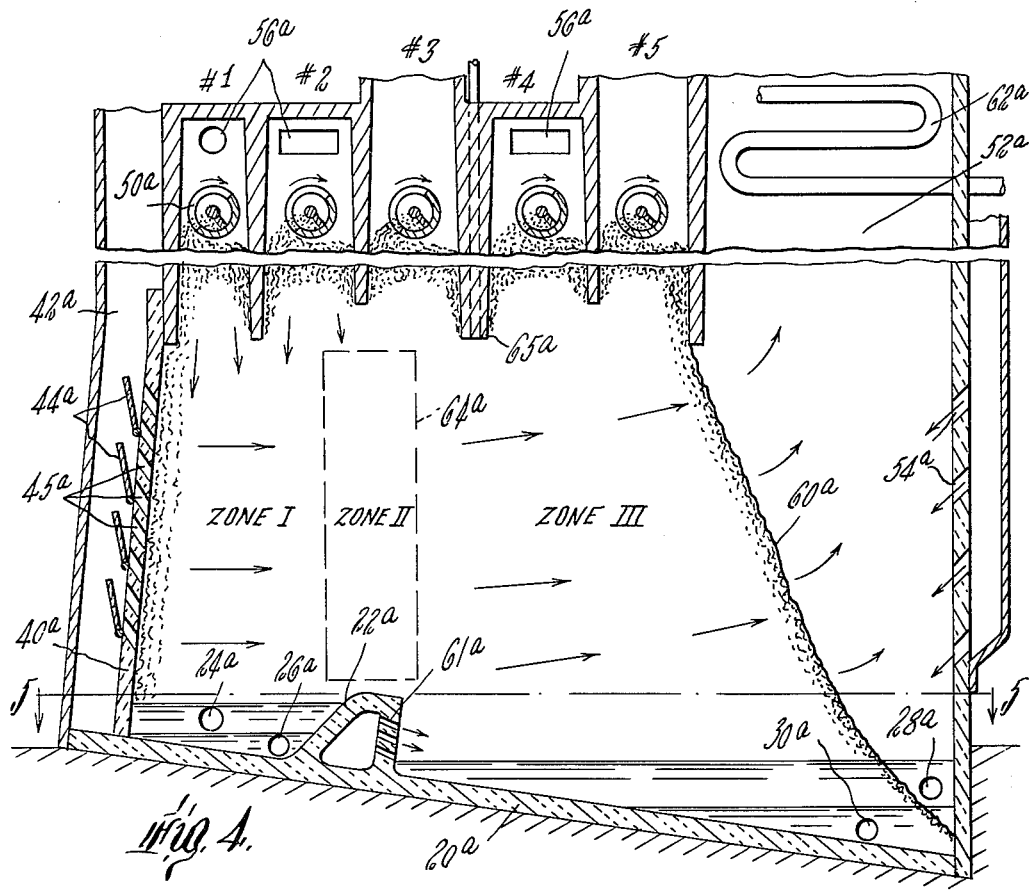
FIG. 4 is a vertical cross-section of a modified form of furnace.

FIG. 4 shows a modification for use in cases where greater flexibility in feed control is desired and where installations are made under circumstances which permit efficient use of off gases which are much hotter than the stack gases in the operation of the furnace of FIG. 1.

The rear portion of the furnace in FIG. 4 is generally similar to that shown in FIG. 1 except that the wall 20a is longer and includes an upstanding dam 22a extending transversely across the apparatus and provided at the sides with tap holes 24a, 26a, 28a and 30a for the removal of slag and reduced metal. The back of the apparatus includes the refractory wall 40a of plenum chamber 42a which communicates with the source of combustion-supporting gas. Baffles 44a again aid in directing the combustion-supporting gases into uniform, or otherwise distributed, flow along the height of the wall through spaced apertures 45a.

Arranged over the furnace chamber are a succession of fuel and ore feeds, each provided with a conventional feed mechanism for distributing the material in a continuous manner across the width of the furnace. The first feed 50a again located substantially over the rear portion of the furnace, is followed in succession by a series of four, in this case, additional feeds so that the particular content and/or rate of feed of material may differ at the various feeds.

At the far right in FIG. 4 there is a stack 52a for the off gases and provision is made for the introduction of small amounts of gases such as air, or oxygen if desired, through a series of apertures 54a.

Each of the compartmentalized feeds Nos. 1, 2 and 4 may also be provided with gas inlets 56a for pre-heating or combustion-supporting purposes. Feeds Nos. 3 and 5 may provide for exhausting gases, principally those, if any, introduced at feeds Nos. 2 and 4, respectively.

In this type of furnace the first feed is again for predominantly solid fuel, with in some cases, some iron ore and bauxite, followed by second, third, fourth and fifth feeds of fuel, ore and limestone in varying contents. If the iron ore is reasonably low in silica content (e.g., unsintered taconite) and has some calcium carbonate and the bauxite has a high alumina content, a molten calcium aluminate may be tapped at 24a and a high quality ferrosilicon at 26a. Or laterites from Cuba and Jamaica may be fed at No. 1 feed to supply iron ore high in alumina.

Here the rear zone beneath the first feed again operates to produce reducing gas in the form of carbon monoxide, and is held in position and overlaid with layers of successive vertical zones of ore, and/or ore, stone and fuel in varying proportion.

With this form of furnace it is necessary that the reducing zone extend throughout the entire portion of the charge and hence sufficient endothermic heat has to be supplied throughout the bed to insure that the products of partial combustion do not fall below a temperature of about 2700° F. and emerge from the inclined off-gas surface 60a of the bed at at least that temperature, since otherwise the ore fed at feed 5 would not be reduced.

Combustion in the rich fuel zone of the bed adjacent the ingress of oxygen-enriched air produces a temperature higher than 4000° F. With pre-heating of the ore charges and combustion of the fuel supplied at the various feeds, supported in addition by the oxygen content of the ore, high temperature conditions can prevail throughout the bed. In addition, secondary air or oxygen may be introduced through air inlets 54a to aid in maintaining the off-gas surface temperature.

Further combustion-supporting gas may be introduced through inlets between the feed compartments one of which is shown at 65a, and at inlets 61a through dam 22a if necessary to secure continuous reaction in the portion of the bed to the right of dam 22a.

The number of ore-fuel zones is limited only by the ability to maintain a reducing condition and a high temperature in the zone of each additional charge. Accordingly, in certain instances additional heat can be supplied by electrical input through carbon electrodes or a carbon block lining. Such electrical energy can, if desired, be readily supplied from energy recovered from the products of combustion.

As will be seen, in contrast with the burden of a conventional blast furnace whose vertical dimension must be limited in order to maintain air permeable structure, the weight of the burden in the reduction furnace shown in FIG. 4 is transverse to the blast flow. The height of the furnace may thus remain limited without restricting the volume of the burden. Since, however, in a conventional blast furnace the off gases are at a temperature not substantially higher than 300° F., it will be seen that the much hotter off gases from the present furnace are a comparably more valuable by-product and therefore must go to heat exchangers (shown at 62a) or find other use in order to provide economical operation.

While all the iron from such a bed may be collected through a single tap, it may be desirable and is within the contemplation of the operation of such a furnace to have multiple taps, as shown in FIG. 4, since often there can be variation in the quality of the iron and of the slag withdrawn from the separate vertical zones of the unitary bed.

Figure 5:
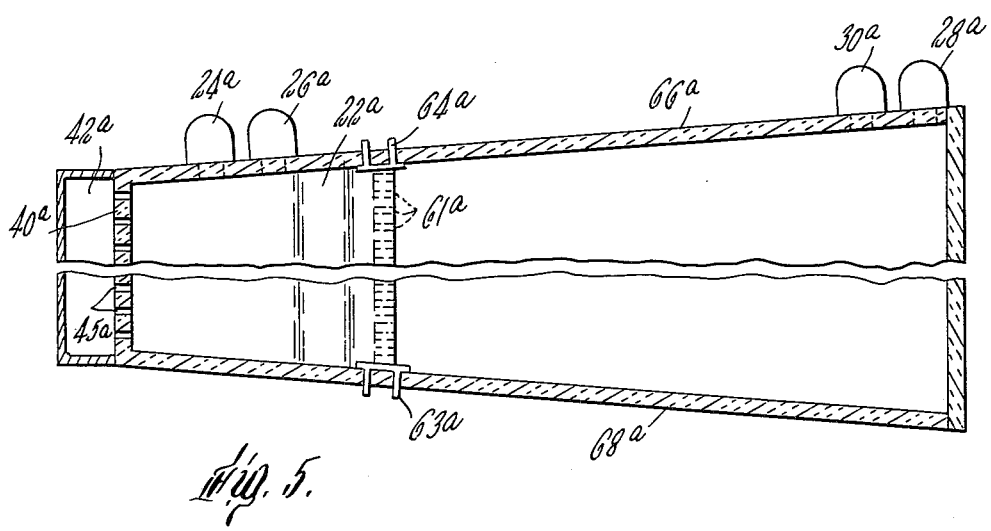
FIG. 5 is a cross-sectional view taken along the line 5—5 of FIG. 4.

The electric power can be supplied to Zone II through electrodes 63a, 64a shown in FIGS. 4 and 5, so that the bed is supplied with the heat equivalent to the kilowatts used. Three electrodes can be used with three-phase alternating current at a suitable voltage.

As shown in FIG. 5, it is contemplated that the bed may have flared side walls 66a, 68a in order to accommodate the additional volumes of gas from the oxygen, ore and limestone used either for combustion or preheating purposes.

Because of the entirely horizontal configuration of the bed in FIG. 4 requiring the hot off-gas surface 60a in Zone III, fuel is required at the feeds Nos. 4 and 5 in order to maintain the carbon monoxide content and temperature high enough to accomplish the FeO to Fe reduction right up to the off-gas surface. This is in contrast to the furnace of FIG. 1 where the carbon monoxide gas-ore contact is much more counterflow than the transverse flow in FIG. 4 and in other furnaces to be later described.

Accordingly, as can be seen, in the furnace of FIG. 1

$$\frac{CO}{CO+CO_2}$$

by volume content and temperatures above 2200°F. can be readily maintained near the bottom of the ore charge, as is necessary to accomplish the FeO to Fe reduction. For example, the $$\frac{CO}{CO+CO_2}$$

ratio by volume should be about 75% at 2200° F. and 80% at 2700° F. or of the order of 72% on a weight or pound mol basis.

However, the reduction of $Fe_2O_3$ and $Fe_3O_4$ to FeO take place at much lower carbon monoxide contents (as little as 20% carbon monoxide in the presence of 10% $H_2O$ and at temperatures as low as 1200° F.). Thus in the upper part of the furnace of FIG. 1, the lower-carbon-monoxide, lower-temperature reduction can take place.

In FIG. 4, however, if low CO content gas only is present near the off-gas surface, satisfactory reduction of the $Fe_2O_3$ in the ore from feed No. 5 will not be secured. Hence additional carbon monoxide must be generated within the bed through the addition of some fuel beyond feed No. 1.

In the apparatus shown in FIG. 6, Zone III has in effect been omitted, and the feeds are confined to three in number. The dam 22a has been omitted since the overall thickness of the beds is substantially decreased from that shown in FIG. 4, but electrodes 64 are still provided and additional electrodes 82 are furnished to provide sufficient heat to insure reducing conditions throughout without the necessary feed of further solid fuel at feeds Nos. 2 and 3.

In the operation of a furnace as shown in FIG. 6, something like 60% of the total available heat may be utilized in ore reduction, leaving about 22% available in the off gases for the open-hearth of which about 7% is sensible heat and 15% calorific heat developed by burning the CO off gases and $H_2$ present with additional air or oxygen introduced through the inlets 80 and/or 81.

In this case, as in other cases, some natural gas containing $CH_4$ as a principal constituent may also be introduced as part of the gas flowing through the perforate rear wall 40b.

The following tables show illustrative examples of operations of the furnaces in FIGS. 1, 4 and 6, respectively. Zone II, in the case of FIG. 4, is taken as the composite operation of the materials fed at feeds 2 and 3 and Zone III is taken as the composite operation of the materials fed at feeds 4 and 5, whereas in FIG. 6, the materials fed at feeds 2 and 3 are taken as being the Zone II operation:

|  | Fig. 1 | | Fig. 4 | | Fig. 6 | |
| --- | --- | --- | --- | --- | --- | --- |
|  | Lb.-mol | Ton | Lb.-mol | Ton | Lb.-mol | Ton |
| ZONE I |  |  |  |  |  |  |
| Entering Zone I: |  |  |  |  |  |  |
| C | 90,000 | 540 | 94,000 | 564 | 90,000 | 540 |
| $O_2$ |  |  | 40,000 | 640 | 39,000 | 624 |
| Air $O_2$ | 51,000 | 816 |  |  |  |  |
| Air $N_2$ | 170,000 | 2,380 |  |  |  |  |
| Air | at 280°F. |  |  |  |  |  |
| $Fe_2O_3$ |  |  | 4,000 | 320 | 4,000 | 320 |
| $CaCO_3$ |  |  | 2,000 | 100 | 1,200 | 60 |
| Tap from Zone I: |  |  |  |  |  |  |
| Slag | 1,800 | 104 | 2,720 | 158 | 3,400 | 197 |
| Molten Fe |  |  | 8,000 | 224 | 8,000 | 224 |

|  | Fig. 1 | | Fig. 4 | | Fig. 6 | |
|---|---|---|---|---|---|---|
|  | Lb.-mol | Ton | Lb.-mol | Ton | Lb.-mol | Ton |
| ZONE II | | | | | | |
| Entering Zone II: | | | | | | |
| C | | | 63,000 | 378 | | |
| $Fe_2O_3$ | See materials entering Zone III | | 21,000 | 1,677 | 22,000 | 1,760 |
| $Fe_2O_2$ | | | 31,000 | 504 | 33,000 | 528 |
| $CaCO_3$ | | | 6,300 | 315 | 6,600 | 330 |
| $CaCO_2$ | | | 6,300 | 139 | 6,600 | 145 |
| At 2700 F.: | | | | | | |
| CO | 78,000 | 1,092 | 96,000 | 1,344 | 90,000 | 1,260 |
| $CO_2$ | 12,000 | 264 | | | 1,200 | 26 |
| $N_2$ | 170,000 | 2,380 | | | | |
| Kw.-hr | | | 2,770,000 | | 1,052,000 | |
| Tap: | | | | | | |
| Slag | 10,400 | 604 | 11,160 | 588 | 8,800 | 511 |
| Molten Fe | 52,000 | 1,451 | 42,000 | 1,173 | 44,000 | 1,228 |
| ZONE III | | | | | | |
| Entering Zone III: | | | | | | |
| C | | | 48,000 | 288 | | |
| $O_2$ | | | 31,000 | 496 | | |
| $Fe_2O_3$ | 26,000 | 2,075 | 14,000 | 1,118 | | |
| $Fe_2O_2$ | 39,000 | 624 | 21,000 | 336 | | |
| $CaCO_3$ | 7,800 | 390 | 4,200 | 244 | | |
| $CaCO_2$ | 7,800 | 172 | 4,200 | 92 | | |
| At 2700 F: | | | | | | |
| $CO_2$ | 90,000 | 1,980 | 6,300 | 139 | | |
| $N_2$ | 170,000 | 2,380 | | | | |
| CO | | | 159,000 | 2,226 | | |
| | | | | | Gas leaving Zone II above | |
| Leaving Zone III: | | | | | | |
| $CO_2$ | 97,800 | 2,152 | 66,500 | 1,463 | 73,800 | 1,624 |
| $N_2$ | 170,000 | 2,380 | | | | |
| CO | | | 151,000 | 2,114 | 24,000 | 336 |
| Tap: | | | | | | |
| Slag | | | 6,750 | 392 | | |
| Molten Fe | | | 28,000 | 782 | | |

The relative quantities used as illustrative for a FIG. 4 operation differ somewhat from those given at page 9 of my earlier co-pending application Serial No. 817,143. In particular a calculated electric heat input is now provided for Zone II to heat the charges at feeds Nos. 2 and 3. Secondly, the oxygen for Zone III has been increased from 432 to 496 to burn more carbon monoxide in Zone III to carbon dioxide with a decrease of carbon monoxide leaving Zone III from 2226 to 2114 and an increase in carbon dioxide emerging from Zone III from 1056 to 1463 tons, thus supplying more heat for the charges entering at feeds Nos. 4 and 5. Lastly, in my prior co-pending application at page 9 the stone fed into Zones II and III was given as of the same weight as the slag leaving. The above calculations for FIG. 4 are based upon the use of $CaCO_3$ in amount equal to $0.3 \times$ the $Fe_2O_3$, while the slag is calculated as equal to $0.4 \times$ the $Fe_2O_3$ to allow for the gangue in the ore, plus $0.02 \times$ the carbon to allow for ash in the fuel. The slag is considered as equivalent to $CaOSiO_2$ with a mol weight of 116. The present calculations are thus more detailed than those set forth in my prior application to illustrate more exact procedure for attaining adequate temperature in Zones II and III.

Heat balances for the above three tabulated operations are as follows, in which the following symbols are used:

c—combustion
sh—sensible heat
f—fusion or dissociation
k—electric heat

HEAT BALANCE

*(FIG. 1)*

ZONE I
90,000 C+51,000 $O_2$+170,000 $N_2$+1,800 Slag=78,000 CO+12,000 $CO_2$+170,000 $N_2$+1,800 Slag

|  | B.t.u. per pound mol (millions) | |
|---|---|---|
|  | Developed | Extracted |
| 78,000 C+39,000 $O_2$=78,000 CO at 47,556 (c) | 3,709 | |
| 12,000 C+12,000 $O_2$=12,000 $CO_2$ at 169,290 (c) | 2,032 | |
| Heat in 78,000 CO at 2700° F. at 21,384 (sh) | | 1,668 |
| Heat in 12,000 $CO_2$ at 2700° F. at 33,750 (sh) | | 405 |
| Heat in 170,000 $N_2$ at 2700° F. at 21,087 (sh) | | 3,585 |
| Heat in 1,800 Slag at 2700° F. at 89,000 (sh) | | 160 |
| Radiation at 5% | | 306 |
| Preheat 221,000 Air to 280° F. at 1,750 (sh) | 390 | |
|  | 6,131 | 6,124 |

HEAT BALANCE—Continued
(FIG. 1)

ZONE II
78,900 CO+12,000 $CO_2$+170,000 $N_2$+26,000 $Fe_2O_3$=52,000 Fe+90,000 $CO_2$+170,000 $N_2$
(The above reactions take place in two stages)

| | | |
|---|---:|---:|
| Zone IIa—26,000 $Fe_2O_3$+heat=52,000 FeO+13,000 $O_2$ at 124,560 (f) | | 3,238 |
| 26,000 CO+13,000 $O_2$=26,000 $CO_2$ at 121,734 (c) | 3,165 | |
| Radiation at 5% | | 158 |
| | 3,165 | 3,396 |
| Deficiency supplied from Zone III | 231 | |
| Zone IIb—52,000 FeO+heat=52,000 Fe+26,000 $O_2$ at 114,840 (f) | | 5,972 |
| 52,000 CO+26,000 $O_2$=52,000 $CO_2$ at 121,734 (c) | 6,230 | |
| Deficiency supplied from Zone III and Radiation at 5% | 54 | 312 |
| | 6,284 | 6,284 |

ZONE III
90,000 $CO_2$+170,000 $N_2$ at 2700° F. to heat charge of 26,000 $Fe_2O_3$+(7,800 $CaCO_3$)+10,400 slag to 2700° F.

| | | |
|---|---:|---:|
| Heat 26,000 $Fe_2O_3$ to 2700° F. at 96,000 (sh) | | 2,496 |
| Calcine 7,800 $CaCO_3$ to CaO and $CO_2$ at 78,000 (f) | | 608 |
| Heat 10,400 Slag to 2700° F. at 89,000 (sh) | | 926 |
| Heat in 90,000 $CO_2$ at 2700° F. at 33,750 (sh) | 3,038 | |
| Heat in 170,000 $N_2$ at 2700° F. at 21,300 (sh) | 3,585 | |
| Heat in 97,800 $CO_2$ at 300° F. at 2,850 (sh) | | 278 |
| Heat in 170,000 $N_2$ at 300° F. at 2,130 (sh) | | 362 |
| Radiation at 5% | | 330 |
| | 6,623 | 5,000 |
| Excess in Zone III | 1,623 | |
| Net excess after supplying 285 to Zone II | 1,338 | |

HEAT BALANCE
(FIG. 4)

ZONE I
94,000 C+40,000 $O_2$+4,000 $Fe_2O_3$+2,000 $CaCO_3$=96,000 CO+8,000 Fe+2,720 Slag

| | B.t.u. per pound mol (millions) | |
|---|---:|---:|
| | Developed | Extracted |
| 4,000 $Fe_2O_3$+heat=8,000 Fe+6,000 $O_2$ at 354,240 (f) | | 1,417 |
| 94,000 C+47,000 $O_2$=94,000 CO at 47,556 (c) | 4,470 | |
| 2,000 $CaCO_3$ calcined to 2,000 CaO+2,000 $CO_2$ at 78,000 (f) | | 156 |
| 2,000 $CO_2$ decomposed to 2,000 CO+1,000 $O_2$ at 74,178 (f) | | 148 |
| Heat in 96,000 CO at 2700° F. at 21,384 (sh) | | 2,053 |
| Heat in 8,000 Fe at 2700° F. at 31,276 (sh) | | 251 |
| Heat in 2,720 Slag at 2700° F. at 89,000 (sh) | | 242 |
| Radiation at 3% | | 134 |
| | 4,470 | 4,474 |

ZONE II
63,000 C+21,000 $Fe_2O_3$+6,300 $CaCO_3$+96,000 CO=159,000 CO+42,000 Fe+6,300 $CO_2$+11,160 Slag

| | | |
|---|---:|---:|
| 21,000 $Fe_2O_3$+heat=42,000 Fe+31,500 $O_2$ at 354,240 (f) | | 7,434 |
| 63,000 C+31,500 $O_2$=63,000 CO at 47,556 (c) | 3,096 | |
| 6,300 $CaCO_3$ calcined to 6,300 CaO+6,300 $CO_2$ at 78,000 (f) | | 490 |
| Heat 63,000 C to 2700° F. at 12,720 (sh) | | 800 |
| Heat 11,160 Slag to 2700° F. at 89,000 (sh) | | 1,000 |
| Heat 21,000 $Fe_2O_3$ to 2700° F. at 96,000 (sh) | | 2,016 |
| Heat 6,300 $CO_2$ to 2700° F. at 33,750 (sh) | | 213 |
| 2,770,000 kw. hr. at 3413 B.t.u. per kw. hr. (k) | 9,457 | |
| Radiation at 5% | | 600 |
| | 12,553 | 12,553 |

ZONE III
48,000 C+31,000 $O_2$+14,000 $Fe_2O_3$+4,200 $CaCO_3$+6,300 $CO_2$+159,000 CO=28,000 Fe+151,000 CO+66,500 $CO_2$+6,750 Slag

| | | |
|---|---:|---:|
| 14,000 $Fe_2O_3$+heat=28,000 Fe+21,000 $O_2$ at 354,240 (f) | | 4,956 |
| 48,000 C+48,000 $O_2$=48,000 $CO_2$ at 169,290 (c) | 8,126 | |
| 8,000 CO+4,000 $O_2$=8,000 $CO_2$ at 121,734 (c) | 975 | |
| 4,200 $CaCO_3$ calcined to 4,200 CaO+4,200 $CO_2$ at 78,000 (f) | | 328 |
| Heat 48,000 C to 2700° F. at 12,720 (sh) | | 610 |
| Heat 31,000 $O_2$ to 2700° F. at 22,275 (sh) | | 690 |
| Heat 14,000 $Fe_2O_3$ to 2700° F. at 96,000 (sh) | | 1,344 |
| Heat 6,750 Slag to 2700° F. at 89,000 (sh) | | 600 |
| Radiation at 6% | | 573 |
| | 9,101 | 9,101 |

HEAT BALANCE

(FIG. 6)

ZONE I

90,000 C+39,000 $O_2$+4,000 $Fe_2O_3$+1,200 $CaCO_3$=90,000 CO+1,200 $CO_2$+8,000 Fe+3,400 Slag

|  | B.t.u. per pound mol (millions) | |
|---|---|---|
|  | Developed | Extracted |
| 4,000 $Fe_2O_3$+heat=8,000 Fe+6,000 $O_2$ at 354,240 (f) |  | 1,417 |
| 90,000 C+45,000 $O_2$=90,000 CO at 47,556 (c) | 4,280 |  |
| 1,200 $CaCO_3$ calcined to 1,200 CaO+1,200 $CO_2$ at 78,000 (f) |  | 94 |
| Heat in 90,000 CO at 2700° F. at 21,384 (sh) |  | 1,924 |
| Heat in 1,200 $CO_2$ at 2700° F. at 33,750 (sh) |  | 40 |
| Heat in 8,000 Fe at 2700° F. at 31,276 (sh) |  | 250 |
| Heat in 3,400 Slag at 2700° F. at 89,000 (sh) |  | 302 |
| Radiation at 5% |  | 214 |
|  | 4,280 | 4,241 |

ZONE II

22,000 $Fe_2O_3$+6,600 $CaCO_3$+90,000 CO+1,200 $CO_2$=44,000 Fe+33,000 $O_2$+7,800 $CO_2$+90,000 CO+8,800 Slag

|  | Developed | Extracted |
|---|---|---|
| 22,000 $Fe_2O_3$+heat=44,000 Fe+33,000 $O_2$ at 354,240 (f) |  | 7,793 |
| 66,000 CO+33,000 $O_2$=66,000 $CO_2$ at 121,734 (c) | 8,034 |  |
| 6,600 $CaCO_3$ calcined to 6,600 CaO+6,600 $CO_2$ at 78,000 (f) |  | 514 |
| Heat 22,000 $Fe_2O_3$ to 2700° F. at 96,000 (sh) |  | 2,112 |
| Heat 8,800 Slag to 2700° F. at 89,000 (sh) |  | 783 |
| Electric heat required 1,052,000 kw.-hr. at 3413 B.t.u. (k) | 3,590 |  |
| Radiation at 3.6% |  | 420 |
|  | 11,624 | 11,622 |
| Gas leaving ZONE II: |  |  |
| 66,000 $CO_2$+7,800 $CO_2$=73,800 $CO_2$ |  |  |
| 90,000 CO−66,000 CO=24,000 CO |  |  |

Arrows utilized in the drawings relate only to the flow direction of gases, as distinguished from fuels and liquids. Fuels used may be anthracite, coke, charcoal, dry wood or any free-burning fuel.

Although specific embodiments of the invention have been described herein, it is not intended to limit the invention solely thereto, but to include all of the obvious variations and modifications within the spirit and scope of the appended claims.

What is claimed is:

1. A method for the reduction of iron ore comprising forming in a furnace a unitary porous bed constituted of free-burning solid carbonaceous fuel, iron ore and limestone in varying proportion across said bed, the fuel constituting a rear vertically extending zone of said bed overlaid with successive horizontally spaced vertically extending zones containing varying contents of ore, said bed having an off-gas surface extending upwardly from the bottom of said bed horizontally opposite said rear fuel zone, blowing oxygen-containing gas into the rear vertically extending surface of said bed and substantially horizontally through said bed as the materials descend in the furnace to reduce the iron contained in said ore and to drive the gaseous reaction products of said carbonaceous fuel out of said off-gas surface at a temperature above the liquid flowing point of the iron in said ore, liquefying the iron in the ore in said bed and the other incombustibles in said bed to cause them to flow downwardly in liquid form towards the bottom of said bed and maintaining said bed porous for the continued horizontal passage of gas therethrough, collecting the liquefied iron and other liquefied incombustibles as they flow out of the bottom of said bed, and replenishing at least a portion of said bed by feeding a mixture of fuel, iron ore and limestone in varying proportions at a plurality of separate horizontally spaced points along the top of the bed laterally in advance of said off-gas surface.

2. A method as claimed in claim 1, wherein fixed sources of exothermic heat are provided at horizontally spaced intervals along the sides of said bed to convert carbon dioxide products of reaction to active carbon monoxide in said bed, the gases issuing from said off-gas surface being primarily reducing gas at a temperature exceeding about 2700° F.

References Cited by the Examiner

UNITED STATES PATENTS

| 455,458 | 7/91 | Eames | 75—41 |
| 891,248 | 6/08 | Gronwall | 75—42 |
| 900,291 | 10/08 | Meissner | 266—25 |
| 1,334,310 | 3/20 | Mace | 266—25 |
| 1,507,740 | 9/24 | Kirby | 75—41 |
| 1,877,123 | 9/32 | Bunce | 75—86 X |
| 1,895,284 | 1/33 | Hay | 202—215 |
| 2,307,459 | 1/43 | Greenawalt | 75—40 |
| 2,503,555 | 4/50 | Lykken | 75—38 X |
| 2,761,772 | 9/56 | Atwell | 48—203 |
| 2,816,823 | 12/57 | Galusha | 48—203 |
| 2,846,301 | 8/58 | Greenawalt | 75—40 |
| 2,952,538 | 9/60 | Cuscoleca et al. | 75—41 |

OTHER REFERENCES

Tieman: Iron and Steel, Third edition, McGraw-Hill Book Co., Inc., New York, 1933, pages 161 and 162 relied on.

DAVID L. RECK, *Primary Examiner.*

MARCUS U. LYONS, RAY K. WINDHAM, ROGER L. CAMPBELL, WINSTON L. DOUGLAS,
*Examiners.*